United States Patent [19]

Tanaka

[11] Patent Number: 5,190,378

[45] Date of Patent: Mar. 2, 1993

[54] LINEAR MOTION ROLLING CONTACT GUIDE UNIT HAVING AN ASYMMETRICAL GUIDE CHANNEL

[75] Inventor: Kazuhiko Tanaka, Fuchu, Japan

[73] Assignee: Nippon Thompson Co., Ltd., Tokyo, Japan

[21] Appl. No.: 764,025

[22] Filed: Sep. 23, 1991

[30] Foreign Application Priority Data

Sep. 27, 1990 [JP] Japan .................................. 2-255410

[51] Int. Cl.⁵ ............................................. F16C 29/06
[52] U.S. Cl. ......................................... 384/49; 384/45
[58] Field of Search ................................... 384/43–45, 384/49

[56] References Cited

U.S. PATENT DOCUMENTS 4,692,038 9/1987 Kasai ..................................... 384/45
4,784,498 11/1988 Geka et al. ............................ 384/45

FOREIGN PATENT DOCUMENTS

71036 5/1950 Denmark ............................... 384/49
149620 9/1982 Japan ..................................... 384/45
241526 10/1986 Japan ..................................... 384/43
126422 5/1989 Japan ..................................... 384/49
611042 6/1978 U.S.S.R. ................................ 384/49

Primary Examiner—Thomas R. Hannon
Attorney, Agent, or Firm—Skjerven, Morrill, MacPherson, Franklin & Friel

[57] ABSTRACT

A linear motion rolling contact guide unit is provided. The present guide unit includes a rail, a slider and a plurality of balls interposed between the rail and the slider. The rail is formed with an inner guide groove and the slider is formed with an outer guide groove located opposite to and in parallel with the associated inner guide groove to thereby define a guide channel in which the balls are interposed between the rail and the slider. The inner and outer guide grooves are defined such that a first distance between two contact points between the ball and the inner guide groove when brought into contact therewith is longer than a second distance between two contact points between the ball and the outer guide groove when brought into contact therewith.

6 Claims, 6 Drawing Sheets

LINEAR MOTION ROLLING CONTACT GUIDE UNIT HAVING AN ASYMMETRICAL GUIDE CHANNEL

BACKGROUND OF THE INVENTION

1. Field of the Invention

This invention generally relates to a linear motion rolling contact guide unit generally comprised of a rail, a slider and a plurality of rolling members interposed between the rail and the slider, and, in particular, to improvements in a guide channel defined between the rail and the slider of such a linear motion rolling contact guide unit.

2. Description of the Prior Art

A linear motion rolling contact guide unit is well known and it generally includes a rail extending straight over a desired length, a slider slidably mounted on the rail and a plurality of rolling members, such as balls and rollers, interposed between the rail and the slider to provide a rolling contact therebetween. A typical prior art linear motion rolling contact guide unit using a plurality of balls as rolling members is schematically illustrated in FIGS. 3 through 7.

Figure 3:
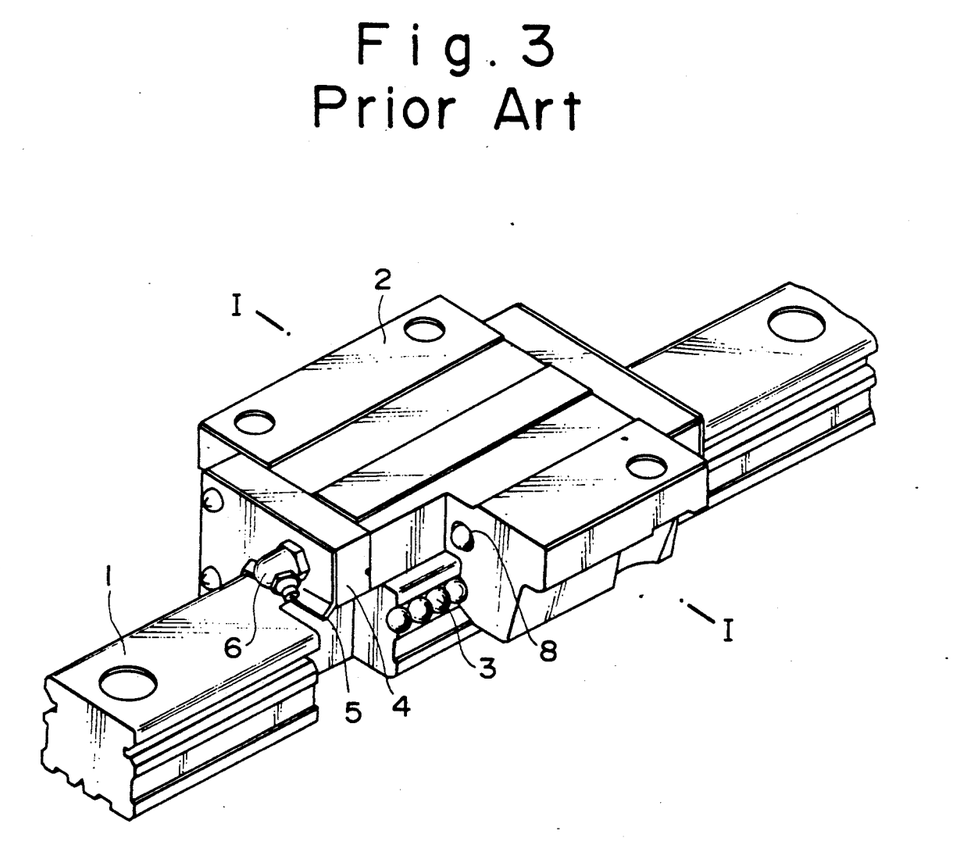
FIG. 3 is a schematic illustration showing in a perspective view a typical prior art linear motion rolling contact guide unit.
Figure 6:
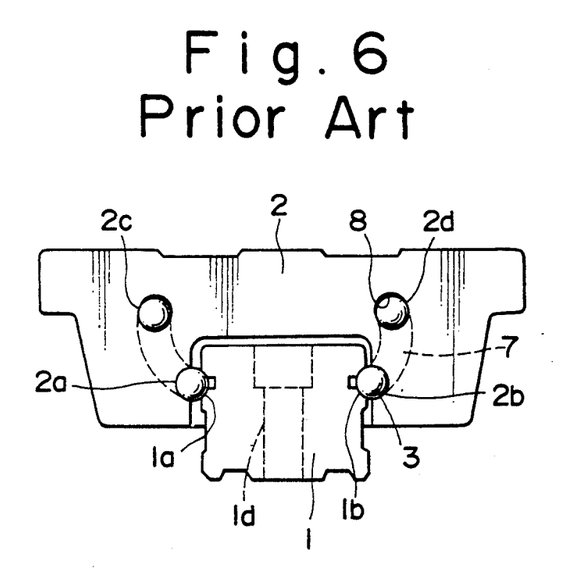
FIG. 6 is a schematic illustration showing in transverse cross section taken along line I—I indicated in FIG. 3.

As shown in FIG. 3, the guide unit includes a rail 1 which extends straight over a desired length and which is generally rectangular or square in cross section and thus includes a top surface, a bottom surface and a pair of side surfaces. As best shown in FIG. 6, a pair of inner guide grooves 1a and 1b is formed on the opposite side surfaces of the rail 1. The guide unit also includes a slider 2 which has a generally inverted U-shaped cross section and thus which includes a horizontal section and a pair of vertical sections depending downward from the opposite sides of the horizontal section as best shown in FIG. 6. Accordingly, the slider 2 is slidably mounted on the rail 1 in a straddling manner. As also best shown in FIG. 6, an outer guide groove 2a, 2b is formed on the inner surface of each of the vertical sections of the slider 2 extending in parallel with and opposite to a corresponding inner guide groove 1a or 1b of the rail 1, so that a guide channel is defined by a pair of such inner and outer guide grooves 1a-2a or 1b-2b.

The slider 2 is provided with a pair of endless circulating paths, each of which includes a load path section, which corresponds to the guide channel 1a-2a or 1b-2b, a return path section 8 and a pair of curved connecting path sections 7 connecting the corresponding ends of the load and return path sections. And, each of the endless circulating paths is provided with a plurality of balls 3 as rolling members, and, thus, these balls 3 roll along the corresponding endless circulating path as a relative motion is created between the slider 2 and the rail 1. Those balls 3 which are located in the load path section or the guide channel 1a-2a or 1b-2b are partly received by the inner guide groove 1a or 1b of the rail 1 and at the same time partly received by the associated outer guide groove 2a or 2b of the slider 2 so that a rolling contact is provided between he rail 1 and the slider 2. Such a linear motion rolling contacting guide unit is advantageous since it can provide a linear relative motion between he rail 1 and the slider 2 over an indefinite discante theoretically without change in performance.

As best shown in FIG. 3, the slider 2 includes a pair of end blocks 4 one located at each of front and rear ends, and the end block 4 is formed with a par of curved connecting path sections 7 of the pair of endless circulating paths. As the slider 2 moves along the rail 1, the balls 2 roll into the return path section 8 from the load path section 1a-2a or 1b-2b through the associated curved connecting path sections 7 o vice versa, and, thus, the balls 3 may roll along the endless circulating the paths endlessly. An end seal 5 is sealingly attached to each of the end blocks 4 so as to prevent any foreign matter, such as debris and oil, from entering into the gap between the rail 1 and the slider 2. The slider 2 is also provided with a grease nipple 6 which allows to supply grease to a desired location i the slider 2.

Figure 4:
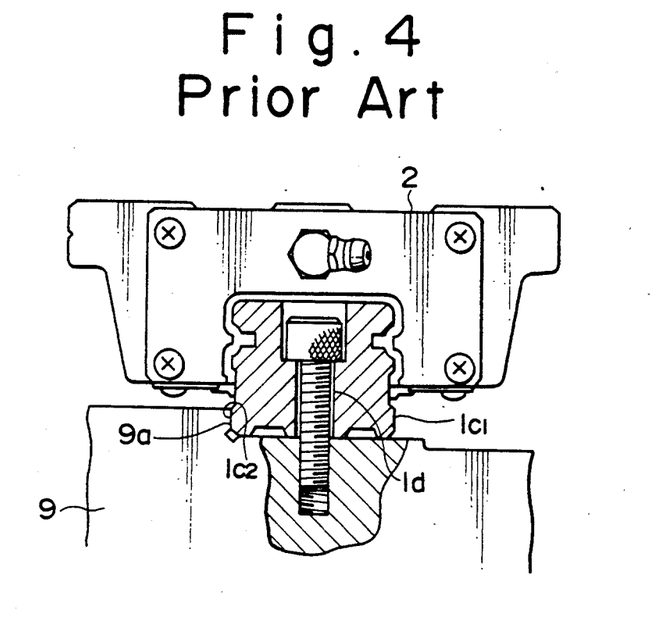
FIG. 4 is a schematic illustration showing in front view and partly in cross section the guide unit of FIG. 3.
Figure 5:
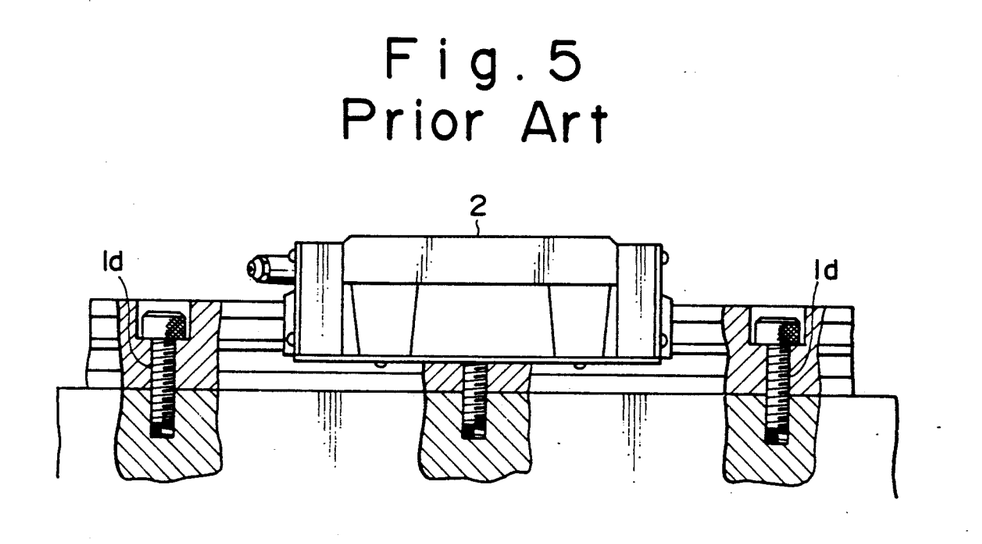
FIG. 5 is a schematic illustration showing in side elevation and partly in cross section the guide unit of FIG. 3.

FIGS. 4 and 5 schematically illustrate how a typical prior art guide unit having the above-described structure is fixedly mounted on a desired object, such as a bed 9 of machining tools or the like. That is, as shown in FIG. 4, the rail 1 is brought into position by bringing one of its side surfaces 1c1 and 1c2 (1c2 in this example) in contact with a reference surface 9a of the bed 9, and, then, the rail 1 is bolted to the bed 9. As best shown in FIG. 5, rail 1 is typical formed with a plurality of mounting holes 1d spaced apart one another at a predetermined distance along the longitudinal axis of the rail 1, and bolts are threaded into threaded holes formed in the bed 9 through these mounting holes 1d.

Figure 7:
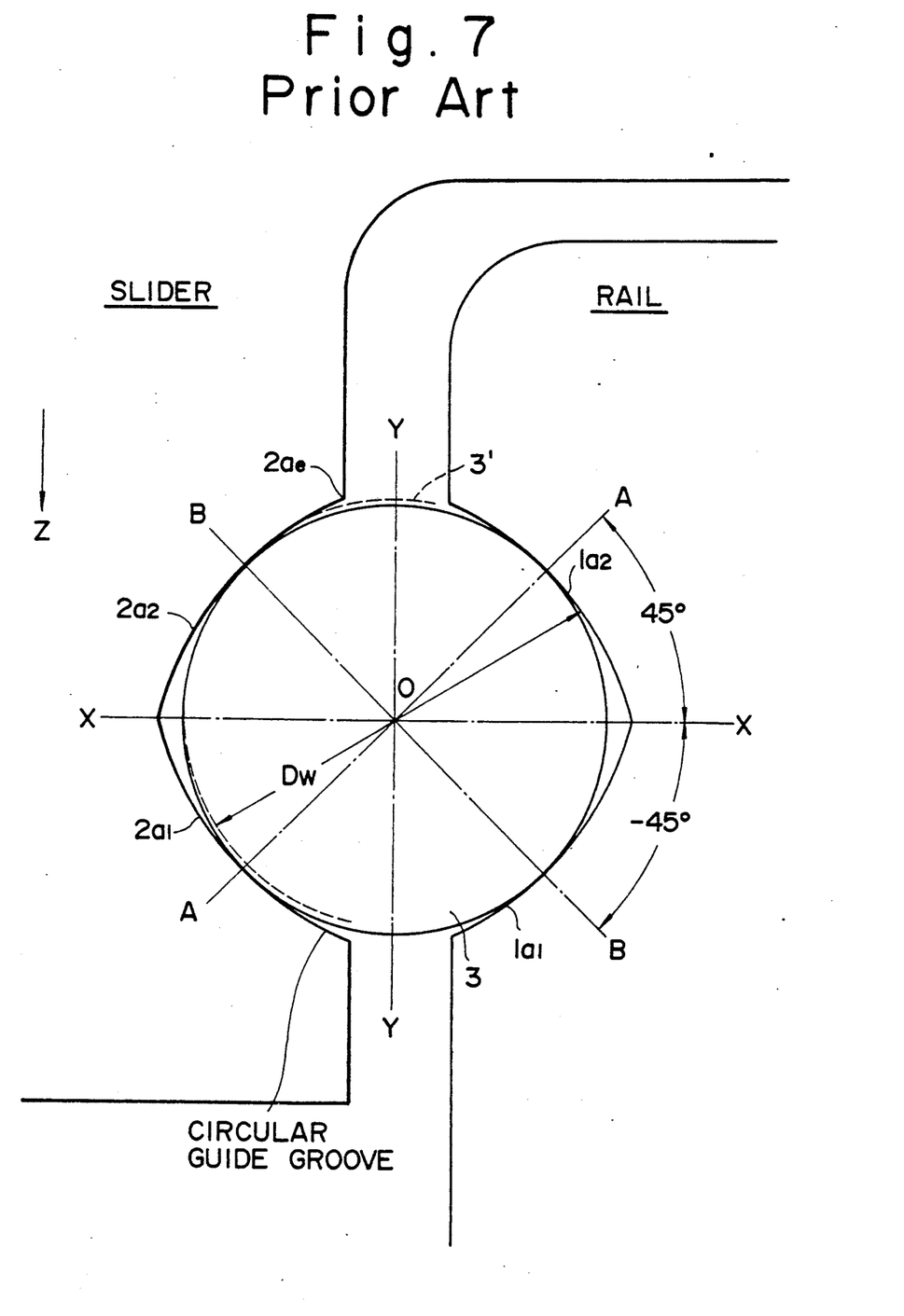
FIG. 7 is a schematic illustration showing the rolling contact condition between the ball and the guide channel in the prior art linear motion rolling contact guide unit of FIG. 3.

FIG. 7 schematically illustrates the rolling contact condition at the guide channel or load path section when the guide unit is fixedly mounted on the bed 9 as shown in FIGS. 4 and 5. As best shown in FIG. 7, the inner guide groove 1a of the rail 1 is defined by a pair of upper and lower circular arc guide surfaces 1a1 and 1a2, and the outer guide groove 2a of the slider 2 is also defined by a pair of upper and lower circular arc guide surfaces 2a1 and 2a2. Under the assembled condition shown in FIG. 7, a hypothetical straight line A—A defined by connecting a contact point between the inner upper guide surface 1a2 and the ball 3 and another contact point between the outer lower guide surface 2a1 and the ball 3 forms an angle of 45° with respect to a hypothetical horizontal line X—X extending through the center 0 of the ball 3 having a diameter of Dw. Likewise, a hypothetical straight line B—B defined by connecting a contact point between the inner lower guide surface 1a1 and the ball 3 and another contact point between the outer upper guide surface 2a2 and the ball 3 forms an angle of 45° with respect to the hypothetical horizontal line X—X in the direction opposite to the line A—A. Thus, the four contact points between the ball 3 and the inner and outer guide surfaces 1a1, 1a2, 2a1 and 2a2 are arranged symmetrically with respect to the horizontal reference line X—X as well as the vertical reference line Y—Y.

However, the above-described structure may suffer from the following disadvantages. In the first place, if a slight mounting error is present between the rail 1 and the slider 2 or between adjacent rails 1 when two or more rails 1 are mounted in a line, a sliding resistance may be increased and may vary along the rail 1. If an external force is applied to the slider 2 vertically downward as indicated by the arrow Z with the presence of a slight mounting error between the rail 1 and the slider 2, the ball 3 would be shifted in position as indicated by the dotted line 3' so that the ball 3 may come into contact with a corner 2ae of the outer upper guide surface 2a2 to be damaged, which could also increase the sliding resistance.

SUMMARY OF THE INVENTION

In accordance with the present invention, there is provided an improved linear motion rolling contact guide unit which generally includes an elongated rail, a slider and a plurality of balls interposed between the rail and the slider. The rail extends over a desired distance and has a side surface which is formed with a generally U-shaped inner guide groove which extends in parallel with the longitudinal axis of the rail. The inner guide groove is defined by a pair of inner upper and lower curved guide surfaces so that the ball contacts with each of the inner upper and lower guide surfaces at one contact point when brought into contact each other. The slider is slidably mounted on the rail and has a side surface formed with a generally U-shaped outer guide groove which extends in parallel with and is located opposite to the inner guide groove of the rail. The outer guide grove is also defined by a pair of outer upper and lower curved guide surfaces so that the ball also contacts with each of the outer upper and lower guide surfaces at one contact with point when brought into contact each other.

In accordance with the present invention, the distance between the two contact points at the inner guide groove is set larger than the distance between the two contact points at the outer guide groove. In a preferred embodiment, each of the curved guide surfaces is defined by a circular arc surface having the same radius of curvature. In addition, a predetermined gap is provided between a guide channel defined by the inner and outer guide grooves and the ball in the guide channel. Preferably, the predetermined gap is set such that, when one of the rail and the slider is moved vertically with respect to the other until the ball comes into contact with one of the outer upper and lower guide surfaces, a hypothetical straight line defined by connecting the contact between the ball and the one of the outer upper and lower guide surfaces and an oppositely located contact between the ball and one of the inner upper and lower guide surfaces substantially pass through the center of the ball. In this case, the ball is preferably in contact with both of the inner upper and lower guide surfaces. In this case also, the hypothetical straight line preferably forms an angle of 45° with respect to a horizontal reference line passing through the center of the ball.

It is therefore a primary object of the present invention to obviate the disadvantages of the prior art as described above and to provide an improved linear motion rolling contact guide unit.

Another object of the present invention is to provide an improved linear motion rolling contact guide unit capable of absorbing mounting errors between two or more rails when laid down in a line or between the rail and the slider.

A further object of the present invention is to provide an improved linear motion rolling contact guide unit low in sliding resistance, smooth in operation and low at cost.

Other objects, advantages and novel features of the present invention will become apparent from the following detailed description of the invention when considered in conjunction with the accompanying drawings.

DESCRIPTION OF THE PREFERRED EMBODIMENTS

Figure 1:
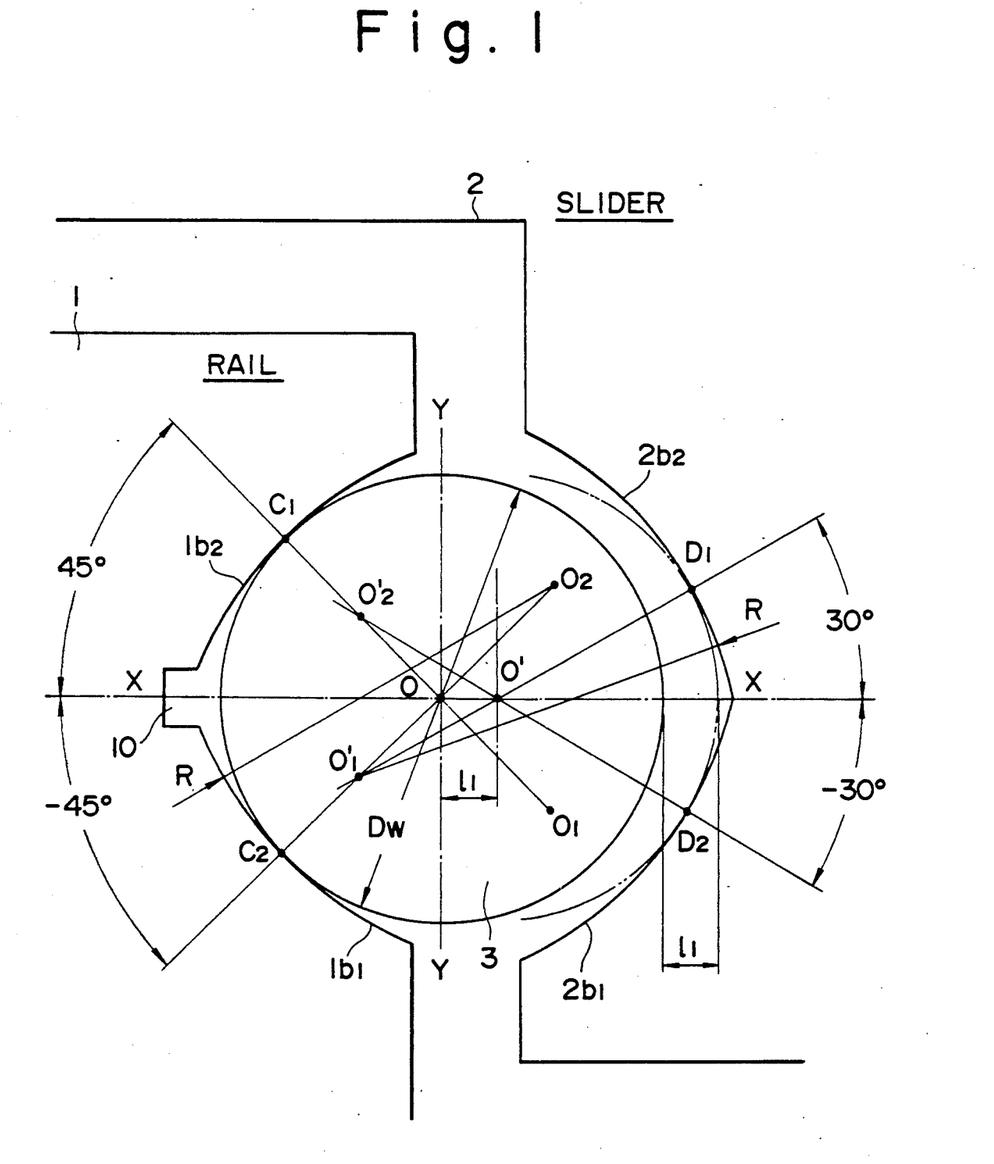
FIG. 1 is a schematic illustration showing the main portion of a linear motion rolling contact guide unit constructed in accordance with one embodiment of the present invention.

Referring now to FIG. 1, one embodiment of the present invention will be described. It is to be noted that FIG. 1 only illustrates the main portion of the first embodiment of the present invention, which generally includes an elongated rail 1, a slider 2 slidably mounted on the rail 1 and a plurality of balls 3 interposed between the rail 1 and the slider 2 to provide a rolling contact between the rail 1 and the slider 2. Since the linear motion rolling contact guide unit of the present invention has a basic structure similar to that of the prior art guide unit shown and described with reference to FIGS. 3 through 7, like elements are indicated by like numerals in FIG. 1. It should be noted, however, that the present invention is not limited only to the basic structure shown in FIGS. 3 through 6, but it is applicable to any other linear motion rolling contact guide unit having a basic structure different from that shown in FIGS. 3 through 6.

As shown in FIG. 1, the present linear motion rolling contact guide unit includes a rail 1 which extends straight over a desired length and which has a pair of opposite side surfaces in which an inner guide groove is formed. As shown in FIG. 1, the inner guide groove is defined by a pair of inner upper and lower guide surfaces $1b2$ and $1b1$. Each of the upper and lower guide surfaces $1b1$ and $1b2$ is a curved guide surface which is preferably defined by a circular arc surface. In the illustrated embodiment, a recess 10 is formed at a junction between the upper and lower guide surfaces $1b1$ and $1b2$ and the recess 10 extends in parallel with the longitudinal axis of the rail 1 for receiving therein a retainer band for retaining the ball 3 in position.

The present linear motion rolling contact guide unit also includes a slider 2 which in turn includes a horizontal section extending above and across the rail 1 and a pair of side sections which extend downward from the opposite sides of the horizontal section so that the slider 2 is slidably mounted on the rail in a straddling manner. The slider 2 has a side surface which is located opposite to the side surface of the rail 1 and which is formed with an outer guide groove located opposite to and in parallel with the associated inner guide groove of the rail 1. The outer guide groove is also defined by a pair of outer upper and lower guide surfaces 2b2 and 2b1, each of which is preferably defined by a circular arc surface.

It will now be described as to how the inner lower and upper guide surfaces 1b1 and 1b2 are defined in the present embodiment. It is assumed that the ball 3 is located at a position indicated by the solid line. A line X—X is a horizontal reference line passing through the center of the ball 3 and a line Y—Y is a vertical reference line passing also through the center of the ball 3. Then, a straight line forming a first angle of 45° with respect to the horizontal reference line X—X is drawn passing through the center O of the ball 3 and an intersection point between this straight line and the contour of the ball 3 is designated as point C1. Then, a point O1 is determined as a point on the straight line passing through points C1 and O and at a distance R from point C1. Then, using this point O1 as a center, a circular arc is drawn to define the upper guide surface 1b2. Similarly, a straight line forming the first angle of 45° in the opposite direction with respect to the horizontal reference line X—X is drawn through the center O of the ball 3 and then an intersecting point between this straight line and the contour of the ball 3 is designated as point C2. Then, a point O2 is determined as a point on the straight line passing through points C2 and O and at a distance R from point C2. Then, using this point O2 as a center, a circular arc is drawn to define the lower guide surface 1b1.

In the embodiment illustrated in FIG. 1, the diameter Dw of the ball 3 is 5.5562 mm and the radius R for defining each of the inner upper and lower guide surfaces 1b1 and 1b2 is 0.56×Dw mm.

Now, it will be described as to how the outer lower and upper guide surfaces 2b1 and 2b2 are defined in the embodiment shown in FIG. 1. A horizontal gap 11 is provided to the right of the ball 3, and, thus, the center of the ball 3 when moved over this distance 11 horizontally is now located as indicated by the dotted line is indicated as center O'. A straight line forming a second angle of 30°, which is smaller than the first angle, is drawn passing through the center O, of the shifted ball 3, and an intersection point between this straight line and the contour of the shifted ball 3 is designated as point D1. Then, a straight line passing through point D1 and center O, is drawn and a point O1' is determined at a distance R from point D1. Then, using this point O'1 as a center, a circular arc is drawn to define the upper guide surface 2b2. In a similar manner, a straight line forming the first angle of 30° in the opposite direction with respect to the horizontal reference line X—X is drawn passing through the center O' of the shifted ball 3 and an intersecting point between this straight line and the contour of the ,shifted ball 3 is designated as point D2. Then, a point O'2 is determined as a point lying on a straight line passing through point D2 and center O' and located at the distance R from point D2. Then, using this point O'2 as a center, a circular arc is drawn to define the lower guide surface 2b1. In the illustrated embodiment, the horizontal gap 11 is chosen to be 50 μm.

With the above-described structure, when the slider 2 is allowed to move downward under gravity with the ball 3 located at its shifted position indicated by the dotted line, a contact angle between the slider 2 and the ball 3, or the angle formed by a straight line passing through a contact point between the outer upper guide surface 2b2 and the ball 3 and through a contact point between the inner lower guide surface 1b1 and the ball 3 with respect to the horizontal reference line X—X, becomes approximately 45°, which establishes an ideal ball contact condition. With this condition, a load can be supported sufficiently and moreover no shortening of service life of the guide unit results. In addition, even if there is a mounting error between two or more rails 1 arranged in a line or between the rail 1 and the slider 2, such a mounting error can be absorbed conveniently automatically, so that no increase in sliding resistance results.

Figure 2:
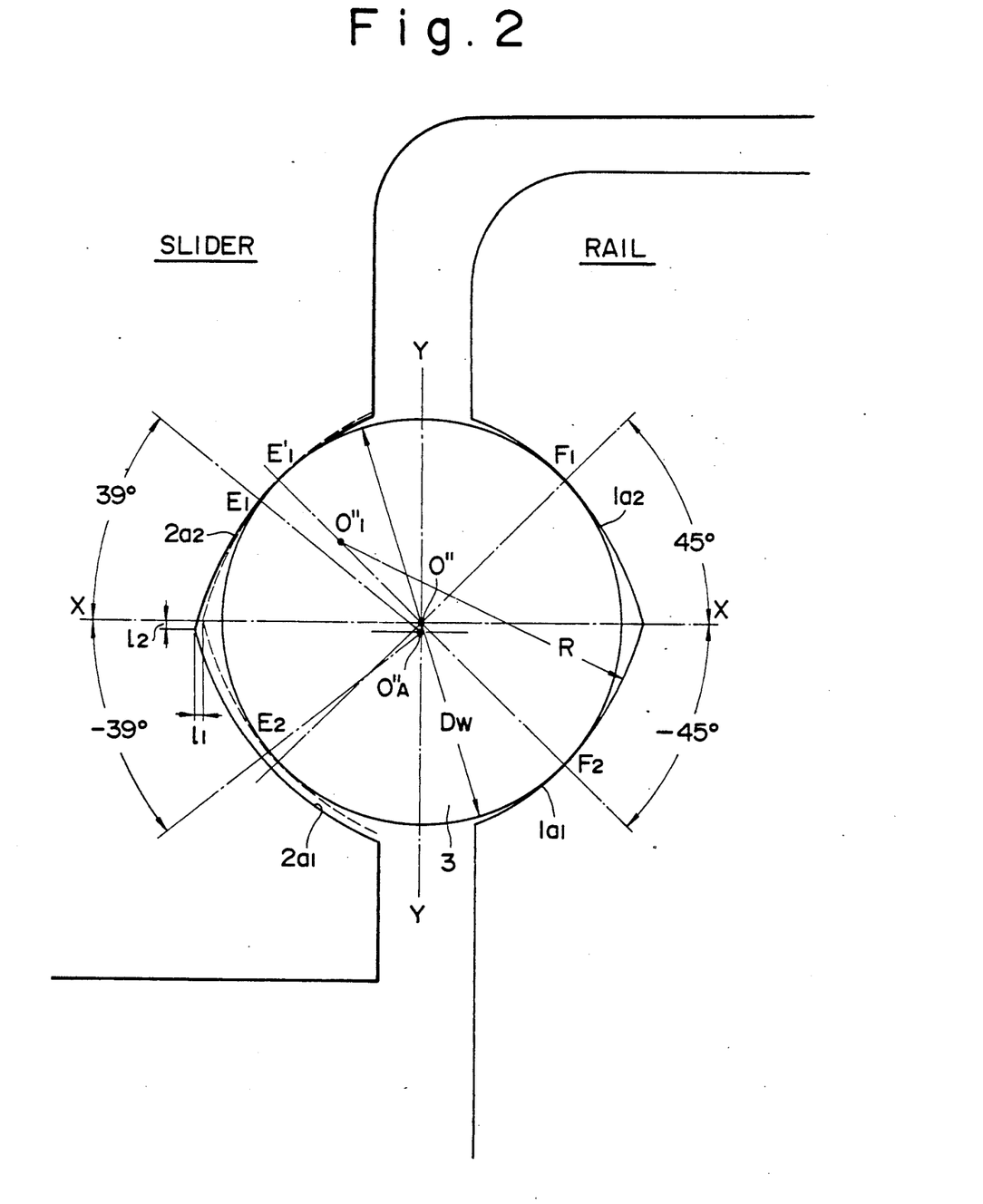
FIG. 2 is a schematic illustration showing the main portion of a linear motion rolling contact guide unit constructed in accordance with another embodiment of the present invention.

Referring now to FIG. 2, there is schematically shown a linear motion rolling contact guide unit constructed in accordance with another embodiment of the present invention. FIG. 2 illustrates the actual use condition in which its slider 2 has already been allowed to move downward under gravity so that the ball 3 is set in a rolling contact with both of the rail 1 and the slider 2. It is to be noted that since the present embodiment is similar in many respects to the first embodiment described above with reference to FIG. 1, like elements are indicated by like numerals in FIG. 2.

In FIG. 2, the inner lower and upper guide surfaces 1a1 and 1a2 and the outer lower and upper guide surfaces 2a1 and 2a2 are defined in a manner similar to that used in the first embodiment. In this embodiment, however, the first angle is selected to be 45° and the second angle at 39°. In the embodiment shown in FIG. 2, the diameter Dw of ball 3 is 5.5562 mm and the radius R for defining the guide surfaces 1a1, 1a2, 2a1 and 2a2 is 0.78×Dw mm. In addition, the horizontal gap 11 is 0.1 mm.

The location of the outer lower and upper guide surfaces 2a1 and 2a2 in contact with the ball 3 without a gap therebetween is indicated by the dotted line in FIG. 2. Under the condition, the ball 3 is in contact with the inner upper and lower guide surfaces 1a2 and 1a1 at points F1 and F2, respectively, and also in contact with the outer upper and lower guide surfaces 2a2 and 2a1 at points E1 and E2, respectively. If these outer lower and upper guide surfaces 2a1 and 2a2 are moved away from the ball 3 over a horizontal gap 11 and then the slider 2 is allowed to move downward under gravity, the slider 2 moves down over a vertical distance 12 and located at a level O"A from the center O" of the ball 3. As a result, the outer lower guide surface 2a1 is separated away from the ball 3 and a contact point between the outer upper guide surface 2a2 and the ball 3 is shifted from point E1 to E1', so that the contact angle between the slider 2 and the ball 3 becomes approximately 45°, which is an ideal ball contact condition. Accordingly, this embodiment can enjoy the same functional effects as those described with reference to the first embodiment.

In both of the first and second embodiments of the present invention described above, since no gap is required for the rail 1, use may be made of any prior art rail and it is only required to modify the outer guide grooves of the slider 2. It should be noted that the specific values for the diameter Dw, contact angles, radius of circular arc and gap 11 are given above only for illustrations and the present invention should not be limited only to these specific values.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion rolling contact guide unit, comprising:

a rail extending over a predetermined distance, said rail having at least one side surface formed with an inner guide groove extending in parallel with a longitudinal axis of said rail, said inner guide groove having a first arc surface;

a slider slidably mounted on said rail, said slider having at least one side surface formed with an outer guide groove located opposite to and in parallel with said inner guide groove to thereby define a guide channel between said inner and outer guide grooves, said outer guide groove having a second arc surface asymmetrically arranged with respect to the art surface of said inner guide groove; and a plurality of balls provided in said guide channel to thereby provide a rolling contact between said rail and said slider;

whereby a first distance between two contact points on eh firs arc surface formed between said inner guide groove and each of said balls when each of said balls are brought into contact with said inner guide groove is longer than a second distance between two contact points on the second arc surface formed between said outer guide groove and each of said balls when each of said balls are brought into contact with said outer guide groove.

2. The unit of claim 1, wherein a predetermined gap is provided between said guide channel and each of said balls in said guide channel.

3. The unit of claim 2, wherein aid predetermined gap is such that, when said slider is allowed to move down under gravability until it comes into contact with each of said balls in contact with said inner guide groove of said rail, a hypothetical straight line drawn to pass through a pair of oppositely located contact points between each of said balls and each of said inner, and outer guide grooves substantially passes through the center of said each of said balls.

4. The unit of claim 3, wherein each of said inner and outer guide grooves is defined by a pair of upper and lower curved guide surfaces.

5. The unit of claim 4, wherein each of said upper and lower curved guide surfaces is defined by a circular arc surface having a predetermined radius.

6. The unit of claim 1, wherein said slider is provided with at least one endless circulating path, including a load path section corresponding to said guide channel, a return path section and a pair of curved connecting path sections connecting the corresponding ends of said load and return path sections, and said plurality of balls are provided in said endless circulating path to roll therealong endlessly.

* * * * *